(12) United States Patent
Duffett-Smith et al.

(10) Patent No.: US 6,937,866 B2
(45) Date of Patent: Aug. 30, 2005

(54) POSITIONING SYSTEMS AND METHODS

(75) Inventors: Peter James Duffett-Smith, Cambridge (GB); James Paul Brice, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 753 days.

(21) Appl. No.: 09/808,048

(22) Filed: Mar. 15, 2001

(65) Prior Publication Data

US 2002/0160788 A1 Oct. 31, 2002

(30) Foreign Application Priority Data

Feb. 23, 2001 (EP) .............................................. 01301679

(51) Int. Cl.[7] .............................................. H04Q 7/20
(52) U.S. Cl. ................... 455/456.1; 455/67.1; 455/423; 342/357.01; 342/357.1
(58) Field of Search .......................... 455/456.1, 67.1, 455/456.2, 456.3, 9, 11.1, 13.2, 423, 115.1; 342/357.01, 357.02, 357.06, 357.07, 357.08, 357.09, 357.1, 357.11, 357.12, 357.13

(56) References Cited

U.S. PATENT DOCUMENTS

| | | | | |
|---|---|---|---|---|
| 6,266,534 B1 | * | 7/2001 | Raith et al. ............... | 455/456.3 |
| 6,298,233 B1 | * | 10/2001 | Souissi et al. ............... | 455/423 |
| 6,466,797 B1 | * | 10/2002 | Frodigh et al. ........... | 455/456.1 |
| 6,587,686 B1 | * | 7/2003 | Cuffaro et al. ............... | 455/423 |
| 6,611,688 B1 | * | 8/2003 | Raith ......................... | 340/992 |

FOREIGN PATENT DOCUMENTS

| | | |
|---|---|---|
| WO | 9711384 | 3/1997 |
| WO | 9730360 | 8/1997 |
| WO | 9852376 | 11/1998 |
| WO | 9921028 | 4/1999 |
| WO | 9953708 | 10/1999 |
| WO | 0073813 | 12/2000 |
| WO | 0073814 | 12/2000 |

* cited by examiner

Primary Examiner—Cong Van Tran
(74) Attorney, Agent, or Firm—Roylance, Abrams, Berdo & Goodman L.L.P.

(57) ABSTRACT

There is described a method of providing a positioning service for plural terminals operating in a communication network which may, for example be a GSM telephone network. The terminals have receivers for receiving signals from transmission sources. In the method measurements of the signals received from one or more of the transmission sources by the receivers are made and the measurements transferred to one or more data nodes. At the data node(s) one or more records of one or more of the measurements are created and at least some of the records are transferred to one or more computing nodes. At the computing node(s) a table of the records transferred to the computing node is maintained and a computation is carried out, using at least part of the table, from which the positions or states of motion or relative positions or relative states of motion of said plural terminals and the transmission time offsets of the transmission sources are extractable.

43 Claims, 4 Drawing Sheets

| BTS Id.<br>Terminal No. | A | B | C | D | L | M | N | O | P | Q |
|---|---|---|---|---|---|---|---|---|---|---|
| 1 | 1048200.8 | 986589.2 | - | 647303 | 303131.5 | 1110746.5 | 905861.4 | - | - | - |
| 2 | - | - | - | 6490 | 4 304799.6 | - | - | - | 1284909.1 | - |
| 3 | - | - | 1002087.3 | 670 | 4.2 326196.6 | 1134101.2 | - | 230183.7 | - | 170708.1 |
| 4 | 411013.0 | 349760.2 | - | 102 | 0 1049212.0 | 473908.8 | 268898.4 | - | - | - |

POSITIONING SYSTEMS AND METHODS

The present invention relates to radio positioning systems and methods, and, more particularly, to radio positioning systems employed in mobile telephone communications networks.

There are many systems known in the art by which the position of a mobile radio receiving station can be determined. Of particular relevance here are those systems for locating mobile terminals in mobile telephone communications networks. One such method, known by its standardised acronym as E-OTD (Enhanced-Observed Time Difference) uses the relative timing offsets of signals received from the network transmitters by a mobile terminal, together with the relative timing offsets of the same signals received by a fixed receiver whose position is known. The second set of measurements by the fixed receiver is required since the transmissions may not be synchronised with respect to each other so that their relative transmission time offsets (i.e. the offsets in the times at which identical parts of the signals are transmitted from different transmitters) are constantly varying and otherwise unknown.

Two principal, and different, methods of using the timing offsets in the position computation have been described in the art. In one, e.g. EP-A-0767594, WO-A-9730360 and AU-B-716647, the details of which are hereby incorporated by reference, the signals measured by the fixed receiver are used, in effect, to 'synchronise' the transmissions from the different transmitters. The instantaneous transmission time offsets of each transmitter relative to its neighbours are calculated from the values measured at the fixed receiver using the known positions of the fixed receiver and the transmitters. The timing offsets measured by the mobile terminal can then be used in a calculation based on well-known standard techniques in which the points of intersection of two or more hyperbolic position lines predicts the position of the mobile terminal.

The other method (see our EP-B-0303371, U.S. Pat. No. 6,094,168 and EP-A-1025453 the details of which are hereby incorporated by reference and which refer to a system known as CURSOR®) makes use of the measurements made by both the fixed receiver and the mobile terminal to calculate the relative time difference between the signals received from each transmitter by both receivers. This results in a calculation based on the intersection of circles centred on the transmitters.

In our WO-A-0073813, the details of which are hereby incorporated by reference, we have shown how the E-OTD technique can be further refined for large networks by combining the measurements from two or more of the fixed receivers (the so-called Location Measurement Units: LMUs), each of which can only receive signals from a subset of the transmitters in the network, to produce a list of the measurements that would have been provided by a single unit, the Virtual LMU (VLMU) had it been able to receive transmissions from the entire network. This technique may be a required element of any practical implementation of E-OTD.

In our WO-A-0073814, the details of which are hereby incorporated by reference, we have also shown how the E-OTD method can be further refined in such a way that the positions of two or more mobile terminals can be determined without the need for any fixed receivers at all i.e. E-OTD without the LMUs. Given the cost of deploying a network of LMUs within an existing communication system, this enhancement is likely to be attractive commercially. It makes use of the fact that measurements of three common transmitters by two mobile terminals can be used to deduce the vector difference between their two positions, and that five common measurements are sufficient to predict the positions of each of them. Furthermore, it was shown that the network transmitters, although not synchronised with each other, nevertheless display a degree of coherence. A measurement of their relative transmission time offsets and rates of change at any one moment can be used to predict the offsets over, perhaps, several minutes. Given the coherence properties of the network transmitters, the measurements made by the two mobile terminals need not be simultaneous, but merely have to be made within one or two minutes of each other. Thus, the trajectory of a single moving mobile terminal can be deduced from a series of measurements made at, say, thirty-second intervals without reference to measurements from any other terminal.

The present invention is intended to provide a method of implementing the LMU-less E-OTD method just described in an existing mobile communications network to provide a positioning service which can be as accurate as that obtained with full LMU deployment, and in which full availability of service can be maintained throughout a network, but which requires no investment in either additional infrastructure such as that needed to set up an LMU network, or in the modification of the network transmitters to operate with external timing reference sources such as GPS.

In accordance with a first aspect of the invention there is provided a method of providing a positioning service for plural terminals operating in a communication network, the terminals having receivers for receiving signals from transmission sources, and the method comprising the steps of a) making measurements of the signals received from one or more of the transmission sources by the receivers in a plurality of the terminals;

b) transferring said measurements to at least one data node;

c) creating at said at least one data node one or more records of one or more of said measurements;

d) transferring at least some of the records to a computing node;

e) maintaining a table of the records transferred to the computing node; and f) carrying out a computation, using at least part of the table, from which computation the positions or states of motion or relative positions or relative states of motion of said plural terminals and the transmission time offsets of the transmission sources are extractable.

The invention includes a communication network, having terminals whose positions or states of motion or relative positions or relative states of motion are to be determined, the terminals each having a receiver for receiving signals from transmission sources and means for making measurements of the signals received from one or more of the transmission sources;

at least one data node having means for acquiring said measurements from said terminals and means for creating one or more records of one or more of said measurements; and a computing node having means for receiving at least some of the records, means for maintaining a table of the records transferred to the computing node, and means for carrying out a computation, using at least part of the table, from which computation the positions or states of motion or relative positions or relative states of motion of said plural terminals and the transmission time offsets of the transmission sources are extractable.

It should be understood that the 'measurements' referred to above and below, and unless indicated otherwise by the context, may be measurements of the relative offsets in time, phase, frequency, or derivatives thereof with respect to each other, or with respect to a reference source, of the signals received by the or each receiver from the transmission sources. The measurements may be sent either automatically, or in response to broadcast information, or in response to specific requests sent from the network to the said mobile terminals and are required to be sufficiently recent to be capable of providing valid data.

The present invention can also provide additional positional accuracy to an existing network already equipped with LMUs, or provide a given level of positional accuracy to a network with fewer LMUs than are needed for conventional E-OTD methods.

The measurements of the signals received from the transmission sources by the receivers may be distributed between plural data nodes.

The data held by any data node may be a record of a single measurement or records of plural measurements.

A data node and a computing node may be located anywhere, for example, they may be co-located with each other. Plural data nodes and computing nodes may be distributed throughout the network, or they may be external to the network.

The components of a record may be distributed between two or more sub-nodes.

The calculation of position may use the measurements from any number of data nodes.

A data node and/or a computing node may be part of, or connected to, a terminal operating in the communication network and thus the invention includes a communication terminal having means for acquiring measurements of the signals received from one or more transmission sources by the receivers in one or more of the terminals operating in the network and means for receiving measurements from the receiver in a mobile terminal whose position or state of motion or relative position or relative state of motion is to be determined.

The invention also includes a communication terminal having a computing node for calculating the position or state of motion or relative position or relative state of motion of the mobile terminal, or of another mobile terminal, using at least some of the measurements reported by the mobile terminal together with all or a part of the record of measurements created at a data node. The terminal may be fixed in position or mobile, in which case it may be a mobile terminal whose position, or state of motion, or relative position or relative state of motion is to be determined. In the case where the computing node is part of, or connected to, a terminal and the data node is elsewhere, one or more of the records held in the data node must be transferred to the computing node before the calculation can be made.

The measurements may additionally include estimates of signal strength, signal quality, or other parameters relating to the reception of the signals by the or each receiver from the transmission sources. In some applications, it may also be an advantage to include information relating to other aspects of a receiver's state, for example its position measured by other means, or its velocity, or its height above sea level. The computation itself may be made either in the computing node, or in another computing node to which the data are passed. The computing node may be in a mobile terminal whose position or state of motion or relative position or relative state of motion is being calculated.

The computing node or nodes may either be connected to or may comprise part of a communication network.

These methods can make use of the fact that in any real, practical network there is always likely to be a large number of mobile terminals operating within the network, even at times of minimum traffic. Most of these will be in their quiescent states ('idle-mode' in a GSM system) waiting to receive calls, although some may be in active use ('dedicated mode' in GSM) or connected to the network in a packet mode such as the General Packet Radio Service (GPRS) in GSM. The positions of most or all of these terminals are unknown, but in idle-mode each reports periodically to the network so that it may be paged should a call come through for it. The coarse position of the terminal is kept in the conventional 'visitor location register' by means of a code (the "location area code") which is usually assigned to a large group of cells. Each such report could additionally carry with it the measurements made by the mobile terminal during its normal idle-mode operation with only a small impact on battery life and signalling load. Alternatively, the network could request the measurements to be sent immediately after receiving a report. If such reports were made, say, every 30 minutes, if the coherence time of the transmitters was 2 minutes, and if each report carried 9 measurements (these values have been observed in practice in GSM networks), then 15 or so terminals operating within one cell taken in isolation would be sufficient to maintain the list of recent measurements ready for any position request which came through. When considered in conjunction with neighbouring cells, the average number of operating terminals required in each cell reduces to just a few.

Should a position request come through in an area where there is a sufficient number of operating terminals, but the reports are not sufficiently recent to be valid, then in this case the system could transmit a request for the terminals to send their measurements to update the records in the data nodes before making the position calculation. The request could be broadcast by a specific cell, or by a group of cells (for example all those with the same location area code), or to specific terminals known to the system to be operating in the right area when last they communicated with the network, or to specific terminals in active connection with the network, either in dedicated mode or packet mode. It is also possible to broadcast the request such that only certain terminals provide measurements, in particular those meeting specific criteria, for example those that have measurements on specific BTSs, or those with certain identifiers.

Only in the case where there are too few operating terminals does the method break down, in which case the position of the centre of the serving cell may be the best that can be managed. However, in an emergency situation where an emergency unit such as a fire engine, police car, or ambulance is dispatched to aid the caller, a mobile terminal within the emergency unit itself could be an additional operating terminal to aid the computation of position. Furthermore, if the emergency vehicle carried GPS or had other means of knowing its own position, it could become the second receiver in a 'normal' E-OTD computation when it arrived within the same general area as the distressed party.

Therefore in accordance with a second aspect of the invention there is provided a method of determining the position or state of motion or relative position or relative state of motion of a mobile terminal in a communication network, the mobile terminal having a receiver for receiving signals from transmission sources, the method comprising the steps of a) acquiring at a data node, measurements of the signals received from one or more of the transmission sources by the receiver in the first mobile terminal whose position or state of motion or relative position or relative state of motion is to be determined;

b) calculating a coarse position or relative position of the first mobile terminal;

c) receiving at said data node measurements made by the receiver in a second mobile terminal near to the coarse position or relative position of the first terminal, together with information about the position of the mobile unit if available; and d) calculating at any one or more computing nodes the position or state of motion or relative position or relative state of motion of either or both of the said mobile terminals using at least some of the measurements made by the first and second mobile terminals.

The second mobile terminal may be dispatched to the coarse position or relative position of the first terminal if one is not already near the coarse position or relative position of the first terminal.

The coarse position may be the centre of the cell serving the first mobile terminal.

The step of calculating a coarse position may be made by two or more computing nodes, one or more of which may be within or connected to either of the mobile terminals, or elsewhere. It is possible that the emergency unit will already be within the vicinity, in which case a request may need to be sent to the terminal carried by the mobile unit for it to report its measurements. The position computation can also be made by one or more computing nodes, which may be within or connected to either of the mobile terminals, or elsewhere.

The present invention also includes a communication network capable of locating terminals by any of the methods described here. In addition, the invention includes, in combination, a mobile or mobiles adapted to send measurements as described above, and a data node adapted to receive such measurements so that the said measurements may form part of the calculation of the position or relative position or state of motion or relative state of motion of another terminal. In some embodiments, it may be an advantage for one mobile terminal to request measurements directly from another, either via the communication network or via a direct link. This would be especially useful, for example, where it was necessary to find the relative offset in position of one mobile terminal with respect to another. In another embodiment, the request to find the position of a mobile terminal may be made by a third party to the network which then instigates any of the methods described here. The transmission sources may be the transmitters of the communications network, transmitters of another communications network, transmitters set up for other purposes (for example public broadcast transmitters or satellite transmitters), transmitters within the fixed and mobile terminals operating in any communications network, or a combination of any of the above.

The new methods described here are not to be considered as exclusive of 'normal' E-OTD operation, but can be used in combination with measurements from LMUs or VLMUs where these are available. Indeed, the optimum method of calculating the position of a mobile terminal is to use all of the information that is sufficiently recent to be valid. This includes measurements from handsets operating in the network, but whose positions are unknown, measurements from handsets operating in the network whose positions have already been computed, or whose positions were previously known through some other mechanism, and measurements from LMUs or VLMUs. The idea is that all the information is put into every position calculation, and it results in a list of positions computed for each of the mobile terminals every time a new calculation is made. Thus it may be that a first calculation of the position of a first mobile terminal is later refined when its measurements are used as part of the calculation of position of a second or subsequent mobile terminal. In a busy system it is possible that many such calculations of the positions of the first mobile terminal are made within the coherence time of the transmitters before its measurements become too old to be useful.

The method also includes the combination of EOTD type measurements described here with measurements from other systems such as GPS. Such a hybrid calculation may be especially useful in situations where there are insufficient measurements of one type for any one system to complete a position calculation, but the combination does provide a solution.

Note that it is not necessary to know the identity, for example the telephone number, of any of the terminals in order to carry out this calculation. The anonymity of private terminals operating in the network can therefore be maintained whilst also using their measurements in the global position calculation.

As has already been mentioned, the system described above may not be fully effective where a request for a position fix comes in from a mobile terminal in a part of the network where there are insufficient other terminals reporting measurements to maintain a large enough list of valid measurements in the data node. In these circumstances, the network might broadcast a request to all the terminals in the area to make immediate reports of their measurements. However, the positions of the mobile terminals are generally coarsely known, usually being specified only within a large segment of the network such as the 'location area' in a GSM network. The present invention allows the positions of all the terminals operating in the network to be calculated from time to time. This provides the basis for maintaining a record of precise positions of the terminals reporting measurements. In addition, a record may be maintained which gives the serving cell used by every terminal in its last communication with the network. Such a list can then be used for specific paging of mobiles to obtain measurement updates. The present invention includes the setting up and maintenance of such a list. Some aspects of the present invention may also be used as diagnostic probes of the network using, for example, the radial error of the calculations of positions of terminals at known locations, or the variation in calculated position of terminals known to be stationary or moving in a known fashion.

The method outlined above can be understood in terms of the following mathematical analysis of a specific example in which measurements are made with respect to a terminal's clock:

Let the positions of the network transmitters A, B, C, etc. be defined by the position vectors a, b, c, etc. all with respect to a common arbitrary fixed origin O (see FIG. 1). Let the positions of the mobile terminals X, Y, Z, etc. be defined by the position vectors x, y, z, etc. all with respect to the same origin. Let the positions of the fixed receivers (the LMUs) K, M, N, etc. be defined by the position vectors k, m, n, etc. again with respect to the same origin. We will assume that the positions of the transmitters and LMUs are known, but not of the mobile terminals. The terminals, fixed and mobile, make measurements of the times of reception of signatures in the signals from the transmitters. For example, in the GSM system, the times of reception of the extended training sequences may be used. Then the times measured by LMU K of the signals from A, B, C, etc. are given by $$vt_{KA}=|k-a|+\alpha_A+\beta_K,$$

$$vt_{KB}=|k-b|+\alpha_B+\beta_K,$$

$$vt_{KC}=|k-c|+\alpha_C+\beta_K, \text{ etc.},$$

where the vertical bars each side of a vector denote the magnitude of that vector, $v$ is the speed of the radio waves, $\alpha_A$, $\alpha_B$, $\alpha_C$ denote the transmission time offsets (expressed in meters by multiplication by $v$) of transmitters A, B, C, and $\beta_K$ is the time offset (expressed in meters) of the internal clock of the LMU K. All times are reckoned with respect to an imaginary universal perfect clock. Similarly, the times measured by LMUs M and N are given by $$vt_{MA}=|m-a|+\alpha_A+\beta_M,$$

$$vt_{MB}=|m-b|+\alpha_B+\beta_M,$$

$$vt_{MC}=|m-c|+\alpha_C+\beta_M, \text{ etc.},$$

and $$vt_{NA}=|n-a|+\alpha_A+\beta_N,$$

$$vt_{NB}=|n-b|+\alpha_B+\beta_N,$$

$$vt_{NC}=|n-c|+\alpha_C+\beta_N, \text{ etc.}$$

Similarly, the sets of equations for the signals received by the mobile terminals are $$vt_{XA}=|x-a|+\alpha_A+\beta_X,$$

$$vt_{XB}=|x-b|+\alpha_B+\beta_X,$$

$$vt_{XC}=|x-c|+\alpha_C+\beta_X \text{etc.},$$

$$vt_{YA}=|y-a|+\alpha_A+\beta_Y,$$

$$vt_{YB}=|y-b|+\alpha_B+\beta_Y,$$

$$vt_{YC}=|y-c|+\alpha_C+\beta_Y, \text{etc.},$$

and $$vt_{ZA}=|z-a|+\alpha_A+\beta_Z,$$

$$vt_{ZB}=|z-b|+\alpha_B+\beta_Z,$$

$$vt_{ZC}=|z-c|+\alpha_C+\beta_Z, \text{ etc.}$$

In the above equations, the $vt$ values are the measurements, and the vectors a, b, c, . . . k, m, n, . . . are all known. The equations can be solved by a variety of well-known techniques to find the values of the unknown quantities x, y, z, . . . , $\alpha_A$, $\alpha_B$, $\alpha_C$, . . . , $\beta_X$, $\beta_Y$, $\beta_Z$, . . . , and $\beta_K$, $\beta_M$, $\beta_N$, . . . In our WO-A-0073813 we show how the individual LMU measurements can be consolidated into a list of the measurements that would have been produced by a single LMU (the VLMU) which could receive signals from all the transmitters in the network. Thus the unknown quantities $\beta_K$, $\beta_M$, $\beta_N$, . . . can first be replaced by a single value for the VLMU, $\beta_V$, and the unknown quantities $\beta_X$, $\beta_Y$, $\beta_Z$, . . . , by the differences $\epsilon_X$, $\epsilon_Y$, $\epsilon_Z$, . . . , where $\epsilon_X=\beta_X-\beta_V$ etc. If any of the terminals additionally carries a GPS clock such that the signals received from the BTSs can be measured with respect to GPS time, then this information can be incorporated into the calculation to reduce the effects of multi-path errors etc. in the result.

As a result of each global computation as described above, the values of the transmission time offsets, $\alpha_A$, $\alpha_B$, $\alpha_C$, etc., are determined, and therefore, it will be appreciated that the time offsets, or relative time offsets, or the rates of change of the time offsets or relative time offsets, of the transmissions from transmission sources using signals received by the plural terminals can be extracted from the computation carried out in the computing node(s).

The values of the transmission time offsets may be stored in a list and used to model the variation in transmission time offset of each BTS as a function of time. The present invention may include the maintenance of such a list, which values could then be used, for example, in a conventional hyperbolic or circular E-OTD position calculation. In synchronised systems, it may be an advantage to calculate the transmission time offsets in this fashion in order to monitor the degree of synchronisation of the network.

One example of a particular implementation of a system according to the present invention will now be described, with reference to FIG. 2, in which a CURSOR® E-OTD system, installed in a GSM network, was used as a test-bed for the present invention.

The implementation may be understood with reference to the accompanying drawings, in which.

Figure 1:
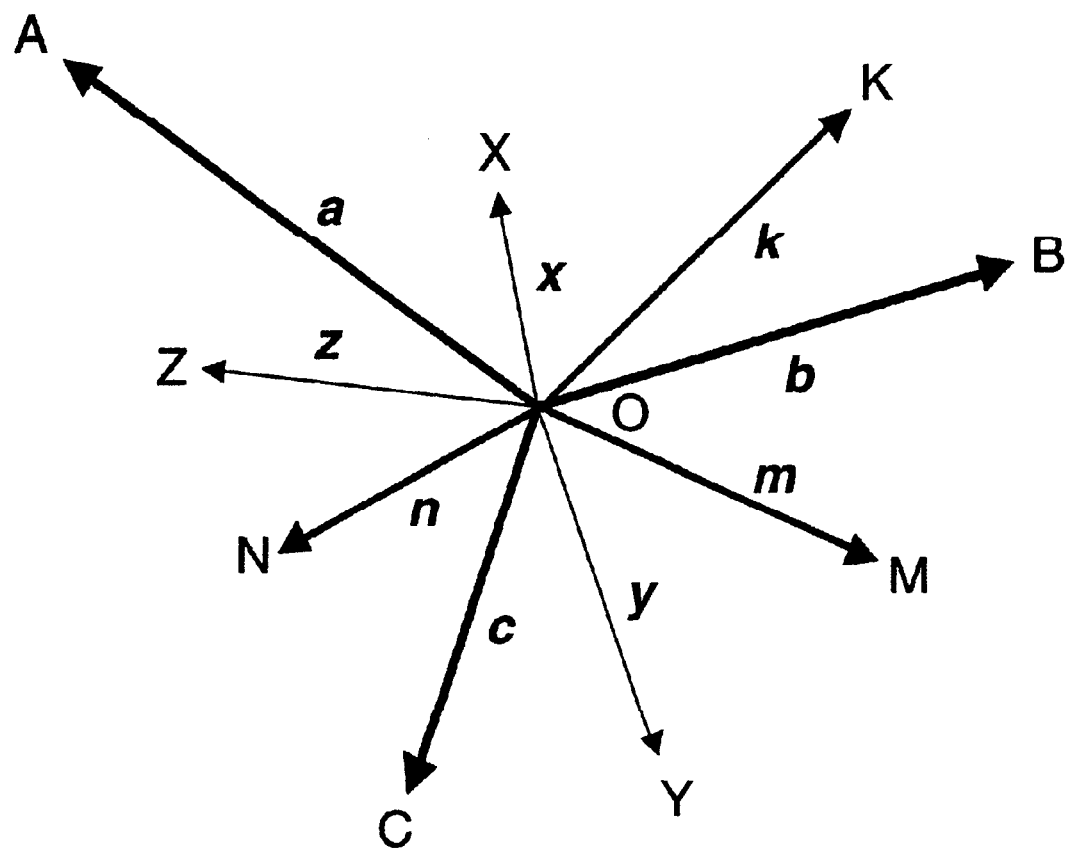
FIG. 1 illustrates position vectors of network transmitters, mobile terminals and fixed receivers (LMVs) with respect to a common origin.
Figure 2:
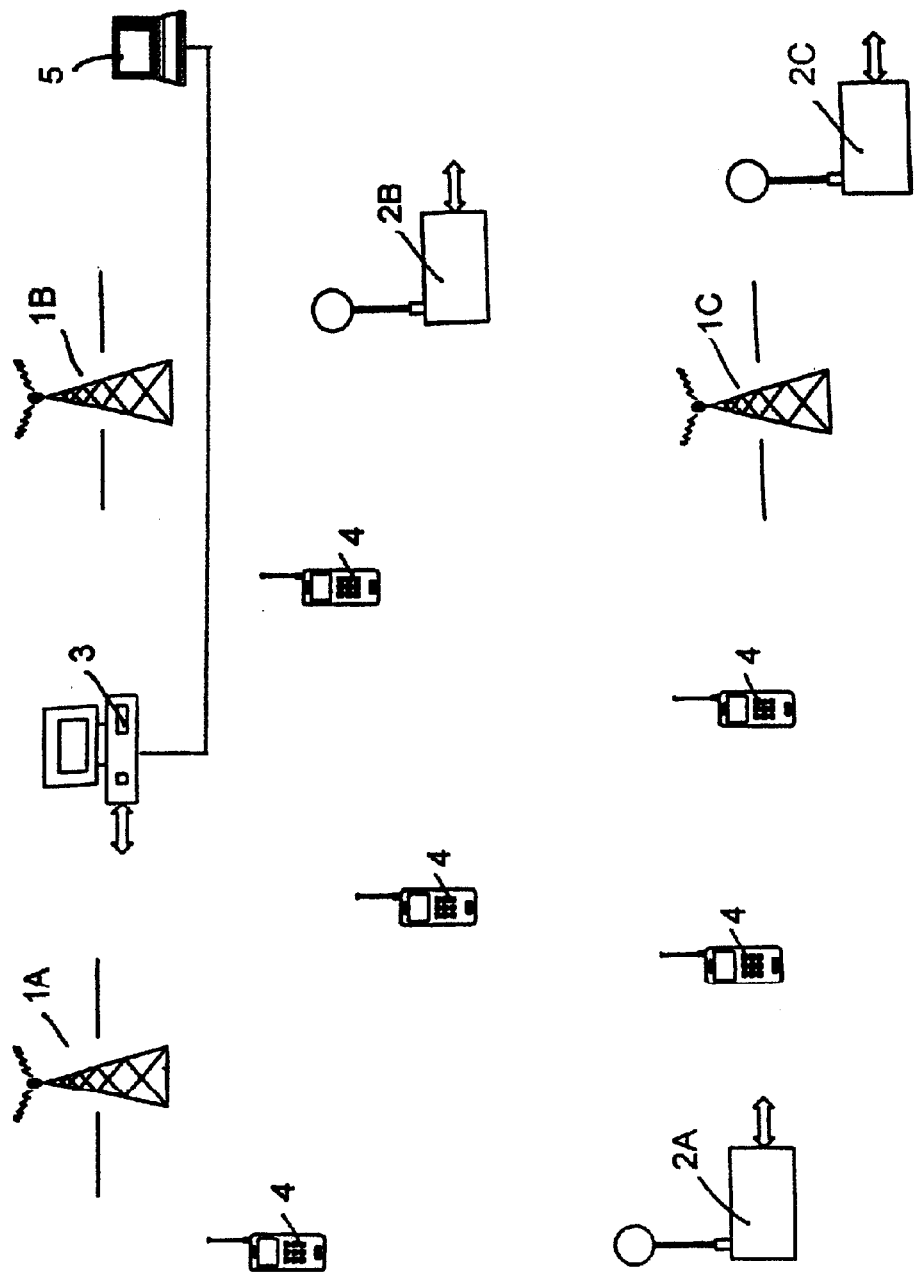
FIG. 2 illustrates the components of the test system within a GSM network.

The standard components of a CURSOR® E-OTD system are shown in FIG. 2 and comprise (a) base transceiver stations (BTSs) 1A, 1B, 1C etc. of the GSM communications network 10, (b) location measurement units (LMUS) 2A, 2B, 2C etc., (c) a Mobile Location Centre (MLC) 3 performing the CURSOR® position calculation function, and (d) several CURSOR® E-OTD capable handsets 4 able to make timing measurements on the signals transmitted by the BTSs 1A etc. The test of the present invention was carried out using the BTSs as the transmission sources, the MLC 3 as a data node, and the handsets 4 as the mobile terminals whose positions were to be determined. The position calculation was performed off-line in a computing node provided by a lap-top computer 5.

In our previous patent application (EP-A-1025453) mentioned above we have described in detail the operation of the GSM CURSOR® system. Signals transmitted by the BTSs 1A etc. on their control channels BCCH contain within them a regularly-repeating structure known as the Extended Training Sequences (ETS). During normal operation, a GSM handset 4 performs a cross-correlation of the demodulated incoming signal with an internally-held ETS template to measure the time offset of the signal with respect to its internal clock. This function is performed both on the signals from the serving BTS (on which the handset is currently registered) and on the signals from a number of neighbouring BTSs. The cross-correlation data is usually discarded after having measured the time offset within an accuracy of about 1 GSM sample interval (3.7 $\mu$s), but when the GSM CURSOR® software is installed the data are processed further to measure the time offset within an accuracy of about 100 ns. A list of time offsets of the signals from the serving BTS and neighbours is produced every 30 s or so and constitutes the normal E-OTD measurements made by the handset 4 as described below.

Figure 3:
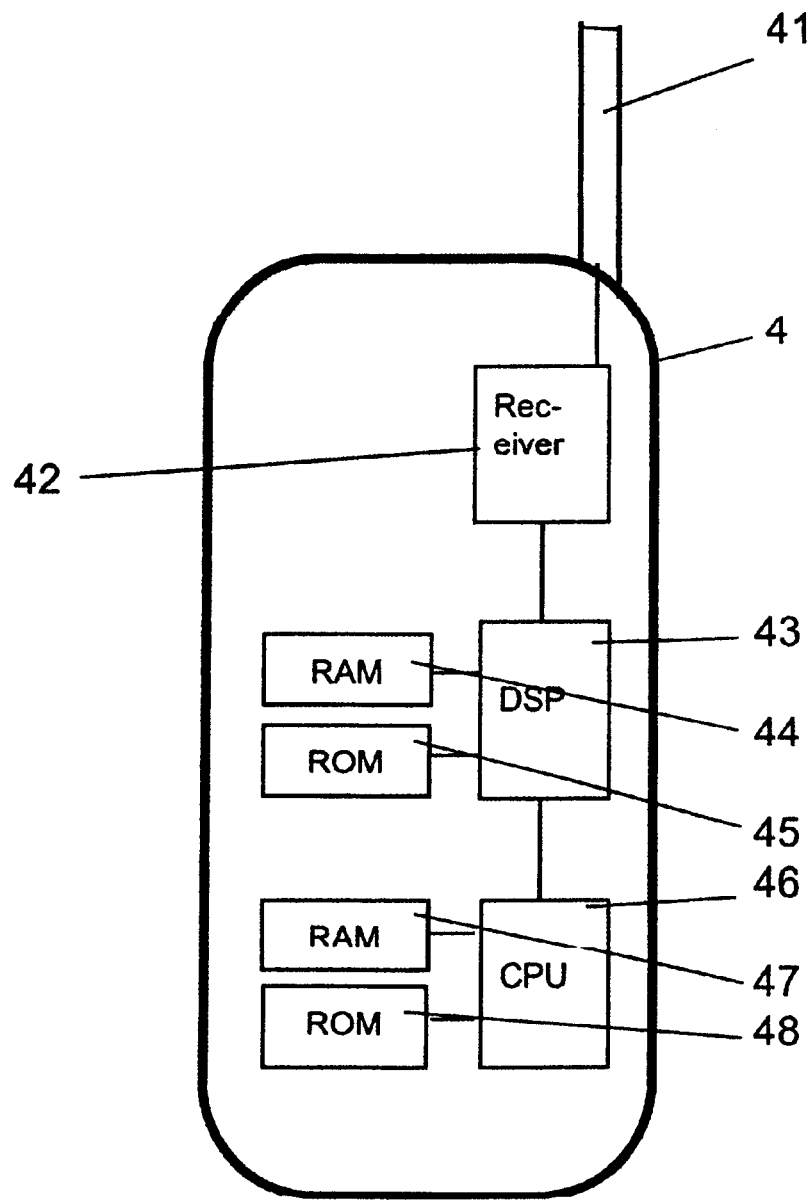
FIG. 3 is a block diagram of the components of a handset used in the test.

As described in our WO-A-9921028, the subject matter of which is hereby incorporated by reference, FIG. 3 is a simplified diagram of a handset comprising a conventional digital cellular radio handset adapted to operate in accordance with the invention. The handset 4 includes an antenna 41 which provides a signal to a receiver 42, from which the received signals from the BTSs 1A etc. are passed to a digital signal processor (DSP) 43. The digital signal processor 43 has an associated RAM 44 and a ROM 45 or similar for containing software used by the DSP 43. A conventional microprocessor or central controller (CPU) 46 receives signals processed by the DSP and also has associated RAM 47 and ROM or similar 48 for containing operating software. The other normal components of a cellular telephone handset, eg battery, keypad, LCD screen etc. are not shown as they are not germane to the present invention. In use, the DSP 43 and associated RAM 44, operating under the control of a modified program stored in ROM 45, operate to carry out the required signal measurements and the microprocessor 46 and associated RAM 47 operate to measure the time offsets of the signals received from the BTSs 1A etc. under the control of a modified program stored in the ROM 48.

In the handset 4, the measurement procedure is carried out in the DSP 43 (see FIG. 3), at regular intervals of between 10 and 60 seconds during the handset's idle time as described in WO-A-9921028. The recorded data is transferred to the CPU controller 46 for storing in RAM 48.

Handsets 4 operating as just described were used for the test. The time offsets were thus measured and were sent, via the Short Message Service (SMS), to the MLC 3 whenever the user pressed a particular button on the handset, and constituted the 'measurements' to be recorded by the data node. A software program running on the MLC 3 received the SMS packet, extracted the measurements, and recorded them on a magnetic disk in records subsequently forming rows of a table (see table of FIG. 4). The MLC 3 and its software program thus provided a data node as mentioned above. Four such mobile terminals (handsets) 4 were deployed spaced a few hundred meters apart within an area covered by the CURSOR® system, and were carried by operators who had previously synchronised their watches. During the test, which was conducted over an interval of about 1.5 hours, the operators were required to press the buttons on their handsets precisely every 3 minutes, each press resulting in an SMS message containing the measurements to the data node (MLC 3). The geographical positions of the BTSs were also recorded. Every SMS message sent by a handset also resulted in a normal CURSOR® E-OTD calculation using both the data from the handset 4 and the data sent in, also by SMS, by the LMUs 2A etc. No use was made of these calculation results, but the LMU measurements were recorded on disk in parallel with the handset measurements. The true positions of the handsets were known to within about 2 meters having been previously measured using differential GPS (DGPS).

Figures 4, 5:
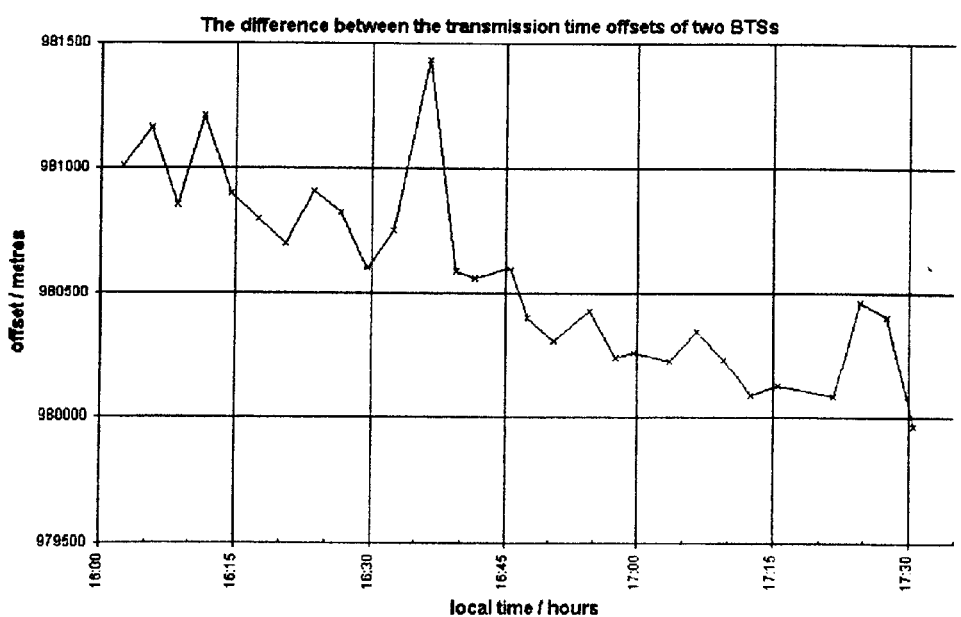
FIG. 4 is an illustration of the table of measurements maintained at the computing node.
FIG. 5 shows the variation with time of the relative transmission time offset between two of the BTSs measured during the test.

After completing the test, the data records were transferred to a laptop computer 5 and combined into a table 6 (see FIG. 4) for processing. A software program was written to analyse the data records in the table 6 according to the method as exemplified by the equations given above. FIG. 4 illustrates the table 6 of data records held, but is not a complete representation of the table, the figure merely illustrating a part of the table. Each row corresponds to a set of measurements from one of the four terminals and each column represents one of a number of BTSs, the measurements in the cells being time offsets of the signals from the respective BTS, measured in meters.

The laptop computer 5 and its program thus provided a computing node as mentioned above. Each block of measurements, made at the same time with the four handsets, resulted in four row entries in the table 6 shown in FIG. 4, and was processed separately, resulting each time in four estimates of position. The radial difference between these estimates and the DGPS positions were computed and are listed in Table 1 below in the columns marked $\Delta R_1$, $\Delta R_2$, $\Delta R_3$, $\Delta R_4$. Each row in this table relates to one block position calculation for the measurements which were recorded at the same local time shown in the left-hand column. Each handset 4 had reported measurements on eight or nine BTS signals, many of which were common to all four handsets 4.

The values of $\Delta R$ were calculated as follows:

$$\Delta R_n = |P_n - A_n|,$$

where the vertical bars denote the magnitude of the enclosed vector, the calculated position of mobile "n" is represented by the vector $P_n$ and the true position (DGPS) by the vector $A_n$.

TABLE 1

Absolute and relative radial errors when LMU data are not used

| Time | Handset 1 errors/m | | Handset 2 errors/m | | Handset 3 errors/m | | Handset 4 errors/m | |
|---|---|---|---|---|---|---|---|---|
| | $\Delta R_1$ | $\sigma R_1$ | $\Delta R_2$ | $\sigma R_2$ | $\Delta R_3$ | $\sigma R_3$ | $\Delta R_4$ | $\sigma R_4$ |
| 16:03 | 188 | 25 | 156 | 34 | 206 | 26 | 208 | 23 |
| 16:06 | 255 | 27 | 230 | 44 | 243 | 1 | 250 | 17 |
| 16:09 | 900 | 32 | 971 | 69 | 944 | 18 | 906 | 40 |
| 16:12 | 207 | 22 | 191 | 34 | 219 | 17 | 199 | 7 |
| 16:15 | 170 | 31 | 210 | 18 | 207 | 29 | 189 | 4 |
| 16:18 | 255 | 32 | 267 | 12 | 272 | 12 | 272 | 9 |
| 16:21 | 358 | 39 | 431 | 36 | 408 | 35 | 385 | 23 |
| 16:24 | 70 | 40 | 78 | 32 | 113 | 35 | 69 | 12 |
| 16:27 | 168 | 25 | 175 | 11 | 206 | 35 | 154 | 38 |
| 16:30 | 205 | 29 | 206 | 8 | 224 | 30 | 160 | 40 |
| 16:33 | 167 | 33 | 186 | 29 | 231 | 48 | 221 | 30 |
| 16:37 | 923 | 40 | 933 | 29 | 1015 | 56 | 972 | 14 |
| 16:40 | 231 | 58 | 327 | 60 | 263 | 42 | 279 | 25 |
| 16:42 | 236 | 28 | 271 | 17 | 255 | 20 | 261 | 8 |
| 16:46 | 129 | 32 | 127 | 8 | 101 | 38 | 130 | 11 |
| 16:48 | 342 | 36 | 388 | 19 | 388 | 23 | 367 | 14 |
| 16:51 | 713 | 42 | 694 | 14 | 664 | 38 | 673 | 19 |
| 16:55 | 324 | 21 | 341 | 22 | 321 | 49 | 315 | 15 |
| 16:58 | 943 | 34 | 966 | 43 | 1024 | 71 | 936 | 39 |
| 17:00 | 427 | 22 | 445 | 11 | 440 | 42 | 432 | 19 |
| 17:04 | 342 | 30 | 388 | 28 | 356 | 29 | 359 | 7 |
| 17:07 | 278 | 26 | 270 | 39 | 221 | 50 | 254 | 13 |
| 17:10 | 317 | 18 | 315 | 15 | 254 | 45 | 313 | 13 |
| 17:13 | 974 | 33 | 988 | 28 | 1054 | 58 | 1002 | 21 |
| 17:16 | 449 | 9 | 477 | 27 | 426 | 54 | 473 | 27 |
| 17:22 | 383 | 16 | 381 | 9 | 418 | 50 | 374 | 26 |
| 17:25 | 351 | 7 | 310 | 40 | 396 | 46 | 344 | 10 |
| 17:28 | 1120 | 18 | 1086 | 50 | 1130 | 48 | 1076 | 29 |
| 17:31 | 2017 | 9 | 2033 | 24 | 2006 | 34 | 2025 | 6 |

Also listed in Table 1 are the relative positions in the columns marked $\sigma R_1$, $\sigma R_2$, $\sigma R_3$, $\sigma R_4$. These were calculated as the radial error of each calculated position relative to its true position after having corrected for the average offset of the calculated positions with respect to their true positions. Hence, these values represent the radial errors with respect to the pattern as a whole, and are a measure of the relative position offsets. If the pattern of calculated positions on the ground was perfect but merely shifted from the pattern of true positions, then the values of σR would be zero. They were calculated as follows:

$$\sigma R_n = \left| (P_n - A_n) - \frac{\sum_{m=1}^{4}(P_m - A_m)}{4} \right|.$$

The vertical bars each side of the vector quantity indicate that the magnitude of the vector must be used.

The results given in Table 1 show how the present invention allows the position offsets of terminals (handsets 4) relative to each other to be determined quite accurately even when the terminals are separated by only a short distance. The radial error in the calculated position of each terminal can be much larger, but decreases as the distance between the terminals increases. If there are several terminals in a given region, such that each is quite close to its neighbour, but the distance between the terminals furthest apart is large, the global calculation will result in accurate positions for all of them. Furthermore, the position of a given terminal can be obtained accurately even when its set of BTS measurements does not have sufficient overlap with that of a distant terminal, provided that there is an 'intermediate' terminal which has sufficient overlap in its measurement set with both the given and distant terminals.

When the LMU values were incorporated into the calculation via the VLMU function (as described in our WO-A-0073813) as well we obtained the results shown in Table 2.

TABLE 2

Absolute and relative radial errors when VLMU data is included

| Time | Mobile 1 errors/m | | Mobile 2 errors/m | | Mobile 3 errors/m | | Mobile 4 errors/m | |
|---|---|---|---|---|---|---|---|---|
| | $\Delta R_1$ | $\sigma R_1$ | $\Delta R_2$ | $\sigma R_2$ | $\Delta R_3$ | $\sigma R_3$ | $\Delta R_4$ | $\sigma R_4$ |
| 16:03 | 64 | 25 | 66 | 35 | 19 | 23 | 25 | 24 |
| 16:06 | 41 | 33 | 40 | 46 | 10 | 5 | 27 | 18 |
| 16:09 | 50 | 27 | 58 | 60 | 14 | 13 | 49 | 39 |
| 16:12 | 44 | 23 | 10 | 32 | 32 | 17 | 28 | 8 |
| 16:15 | 77 | 28 | 42 | 19 | 68 | 25 | 65 | 5 |
| 16:18 | 33 | 32 | 17 | 13 | 13 | 10 | 15 | 9 |
| 16:21 | 52 | 33 | 64 | 40 | 19 | 30 | 47 | 21 |
| 16:24 | 42 | 41 | 49 | 32 | 20 | 34 | 33 | 14 |
| 16:27 | 19 | 24 | 21 | 12 | 25 | 33 | 46 | 37 |
| 16:30 | 24 | 28 | 24 | 9 | 31 | 27 | 68 | 38 |
| 16:33 | 39 | 32 | 28 | 28 | 92 | 43 | 62 | 28 |
| 16:37 | 39 | 36 | 36 | 31 | 101 | 48 | 64 | 16 |
| 16:40 | 76 | 54 | 15 | 55 | 90 | 40 | 69 | 27 |
| 16:42 | 59 | 23 | 52 | 15 | 72 | 17 | 46 | 9 |
| 16:46 | 19 | 33 | 53 | 11 | 88 | 40 | 39 | 13 |
| 16:48 | 66 | 32 | 45 | 17 | 64 | 15 | 71 | 14 |
| 16:51 | 37 | 47 | 27 | 15 | 72 | 36 | 61 | 23 |
| 16:55 | 50 | 18 | 34 | 19 | 82 | 44 | 52 | 13 |
| 16:58 | 56 | 17 | 9 | 31 | 80 | 47 | 37 | 30 |
| 17:00 | 43 | 20 | 22 | 15 | 57 | 35 | 45 | 16 |
| 17:04 | 30 | 23 | 24 | 28 | 46 | 22 | 25 | 7 |
| 17:07 | 8 | 24 | 34 | 43 | 67 | 51 | 24 | 12 |
| 17:10 | 11 | 18 | 16 | 17 | 74 | 45 | 18 | 11 |
| 17:13 | 35 | 28 | 17 | 17 | 75 | 43 | 23 | 14 |
| 17:16 | 5 | 6 | 29 | 33 | 58 | 55 | 18 | 20 |
| 17:22 | 40 | 11 | 40 | 10 | 92 | 48 | 33 | 28 |
| 17:25 | 12 | 1 | 31 | 42 | 61 | 50 | 8 | 11 |
| 17:28 | 25 | 15 | 29 | 31 | 58 | 39 | 25 | 9 |
| 17:31 | 21 | 10 | 9 | 30 | 54 | 33 | 21 | 3 |

Note that the incorporation of the VLMU measurements improves the accuracy of the absolute positions but has little affect in the relative positions As noted above, an output from the alobal position calculations include estimates of the transmission time offsets of the BTSs used in the measurements. Under the conditions of the present test, these offsets were calcuated, in effect, with respect to a changing 'common' clock which involved a combination of the times measured by the individual clicks within the handsets. There is no simple relationship between the value of $\alpha_A$, $\alpha_B$, $\alpha_C$, ect. themselves calculated from measurement to measurement but the transmission time offsets relative to each other, $\alpha_B - \alpha_A$, $\alpha_C - \alpha_A$, do bear simple relationships, This is illustrated in Table 3 and FIG. 5 where the difference between the transmission time offsets of two of the BTSs used in the test is plotted against time. It is clear that a simple linear model, for example, would fit the plotted data over several minutes.

TABLE 3

Relative transmission time offsets between two BTSs used in the test

| Time | RTO/m |
|---|---|
| 16:03 | 981007 |
| 16:06 | 981163 |
| 16:09 | 980857 |
| 16:12 | 981207 |
| 16:15 | 980901 |
| 16:18 | 980800 |
| 16:21 | 980702 |
| 16:24 | 980909 |
| 16:27 | 980829 |
| 16:30 | 980600 |
| 16:33 | 980754 |
| 16:37 | 981435 |
| 16:40 | 980585 |
| 16:42 | 980560 |
| 16:46 | 980598 |
| 16:48 | 980396 |
| 16:51 | 980309 |
| 16:55 | 980425 |
| 16:58 | 980245 |
| 17:00 | 980261 |
| 17:04 | 980228 |
| 17:07 | 980344 |
| 17:10 | 980233 |
| 17:13 | 980084 |
| 17:16 | 980123 |
| 17:22 | 980082 |
| 17:25 | 980461 |
| 17:28 | 980399 |
| 17:31 | 979964 |

In a commercial implementation of the system of the invention, the calculations would be made whenever a position request came in. Thus, measurement reports from terminals operating in the network would be accumulated, but the calculation would be dependent on a specific position request. In a busy network, therefore, the time required to complete the calculation might be many seconds since it might involve the measurements from a large number of terminals, so would be computationally expensive. Alternatively, the calculations could be made periodically or whenever sufficient new reports from terminals had been received. The resulting values of transmission time offsets, $\alpha_A$, $\alpha_B$, $\alpha_C$, etc., could be used to update a model of the changing transmission time offset of BTSs A, B, C, etc. which would be available for immediate use in any subsequent position calculation. In this fashion, the computational load could be spread out over time, thus reducing the delay in responding to a position request.

What is claimed is:

1. A method of providing a positioning service for plural terminals operating in a communication network, the terminals having receivers for receiving signals from transmission sources, and the method comprising the steps of
   a) making measurements of the signals received from one or more of the transmission sources by the receivers in a plurality of the terminals;

b) transferring said measurements to at least one data node;

c) creating at said at least one data node one or more records of one or more of said measurements;

d) transferring at least some of the records to a computing node;

e) maintaining a table of the records transferred to the computing node; and f) carrying out a computation, using at least part of the table, from which computation the positions or states of motion or relative positions or relative states of motion of said plural terminals and the transmission time offsets of the transmission sources are extractable.

2. A method of determining the position or state of motion or relative position or relative state of motion of a mobile terminal in a communication network, the mobile terminal having a receiver for receiving signals from transmission sources, the method comprising the steps of a. acquiring at a data node, measurements of the signals received from one or more of the transmission sources by the receiver in the first mobile terminal whose position or state of motion or relative position or relative state of motion is to be determined;

b. calculating a coarse position or relative position of the first mobile terminal;

c. receiving at said data node measurements made by the receiver in a second mobile terminal whose position is unknown but which is near to the coarse position or relative position of the first terminal; and d. calculating at any one or more computing nodes the position or state of motion or relative position or relative state of motion of either or both of the said mobile terminals using at least some of the measurements made by the first and second mobile terminals.

3. A method of providing a positioning service for plural terminals operating in a communication network, the terminals having receivers for receiving signals from transmission sources, and the method comprising the steps of a) making measurements of the signals received from one or more of the transmission sources by the receivers in a plurality of the terminals;

b) transferring said measurements to at least one data node;

c) creating at said at least one data node one or more records of one or more of said measurements;

d) transferring at least some of the records to a computing node;

e) maintaining a table of the records transferred to the computing node; and f) carrying out a computation, using at least part of the table, to calculate, simultaneously, the positions or states of motion or relative positions or relative states of motion of two or more of said plural terminals whose measurements form part of the record, and the transmission time offsets of the transmission sources.

4. A communication network having plural terminals whose positions or states of motion or relative positions or relative states of motion are to be determined, the terminals each having a receiver for receiving signals from transmission sources and means for making measurements of the signals received from one or more of the transmission sources;

at least one data node having means for acquiring said measurements from said terminals and means for creating one or more records of one or more of said measurements; and a computing node having means for receiving at least some of the records, means for maintaining a table of the records transferred to the computing node, and means for carrying out a computation, using at least part of the table, from which computation the positions or states of motion or relative positions or relative states of motion of two or more of said plural terminals and the transmission time offsets of the transmission sources are extractable.

5. A communication network having plural terminals whose positions or states of motion or relative positions or relative states of motion are to be determined, the terminals each having a receiver for receiving signals from transmission sources and means for making measurements of the signals received from one or more of the transmission sources;

at least one data node having means for acquiring said measurements from said terminals and means for creating one or more records of one or more of said measurements; and a computing node having means for receiving at least some of the records, means for maintaining a table of the records transferred to the computing node, and means for calculating, simultaneously using at least part of the table, the positions or states of motion relative positions or relative states of motion of two or more of said plural terminals whose measurements form part of the record, and the transmission time offsets of the transmission sources.

6. A method according to claim 1, claim 2 or claim 3, wherein measurements are sent automatically.

7. A method according to claim 1, claim 2 or claim 3, wherein the measurements are sent in response to broadcast information.

8. A method according to claim 1, claim 2 or claim 3, wherein the measurements are sent in response to specific requests sent from the network to said mobile terminals.

9. A method according to claim 1, claim 2 or claim 3, wherein the measurements of the signals received from the transmission sources by the receivers are distributed between plural data nodes.

10. A method according to claim 1, claim 2 or claim 3, wherein the record held by any data node is a record of a single measurement.

11. A method according to claim 1, claim 2 or claim 3, wherein the record held by any data node is a list of plural measurements.

12. A method according to claim 1, claim 2 or claim 3, wherein the components of a record are distributed between two or more sub-nodes.

13. A method according to claim 1, claim 2 or claim 3, wherein the calculation of position uses the measurements from a number of data nodes.

14. A method according to claim 1, claim 2 or claim 3, wherein the measurements additionally include estimates of signal strength, signal quality, or other parameters relating to the reception of the signals by the or each receiver from the transmission sources.

15. A method according to claim 1, claim 2 or claim 3, wherein calculation of location includes information relating to other aspects of a receiver's state, for example its position measured by other means, or its velocity, or its height above sea level.

16. A method according to claim 1, claim 2 or claim 3, wherein calculation of location includes using measurements from GPS systems.

17. A method according to claim 1, claim 2 or claim 3, wherein a request is transmitted to the terminals to send their measurements to update the records in the data nodes before the position calculation is made.

18. A method according to claim 17, wherein the request is broadcast by a specific cell.

19. A method according to claim 17, wherein the request is broadcast by a group of cells.

20. A method according to claim 17, wherein the request is broadcast to specific terminals known to the system to be operating in the right area when last they reported in.

21. A method according to claim 17, wherein the request is broadcast to specific terminals in active connection with the network.

22. A method according to claim 17, wherein the request for measurements is broadcast from terminals that have measurements on specific BTSs.

23. A method according to claim 17, wherein the request for measurements is broadcast from terminals that have predetermined identifiers.

24. A method according to claim 1, claim 2 or claim 3, wherein a computing node is within or connected to a mobile terminal.

25. A method according to claim 1 or claim 2, used to calculate, simultaneously, the positions or states of motion or relative positions or relative states of motion of plural terminals whose measurements form part of the record.

26. A communication network adapted to locate terminals connected to the network in accordance with the method of claim 1, claim 2 or claim 3.

27. A communication terminal adapted to send measurements in accordance with the method defined in claim 1, claim 2 or claim 3, and a data node adapted to receive such measurements whereby said measurements may form part of the calculation of the position or relative position or state of motion or relative state of motion of another communication terminal.

28. Method according to claim 1, further comprising maintaining, within the radio telephone communication network, a record which gives the calculated position of every terminal at its last communication with the network.

29. Method according to claim 1, further comprising maintaining, within the radio telephone communication network, a record which gives the serving cell used by every terminal in its last communication with the network.

30. A method according to claim 1, claim 2 or claim 3, which includes maintaining a list of the values of the transmission time offsets of BTSs in the network.

31. A method according to claim 28, further comprising monitoring the degree of synchronisation of the network using said list of the values of the transmission time offsets.

32. A method according to claim 2, wherein the second mobile terminal is dispatched to the coarse position or relative position of the first terminal if one is not already near the coarse position or relative position of the first terminal.

33. A method according to claim 2 or claim 32, wherein the step of calculating a coarse position is made by two or more computing nodes.

34. A communication network according to claim 4 or 5, wherein a data node and a computing node are co-located with each other.

35. A communication network according to claim 4 or 5, wherein plural data nodes and computing nodes are distributed throughout the network.

36. A communication network according to claim 4 or 5, wherein a data node and/or a computing node are part of, or connected to, a terminal operating in the communication network.

37. A communication network according to claim 4 or 5, wherein the computing nodes are connected to the communication network.

38. A communication network according to claim 4 or 5, wherein the computing nodes comprise part of the communication network.

39. A communication network according to claim 4 or 5, wherein the transmission sources include fixed transmitters of the communications network.

40. A communication network according to claim 4 or 5, wherein the transmission sources include fixed transmitters of another communication network.

41. A communication network according to claim 4 or 5, wherein the transmission sources include transmitters set up for non-telecommunications purposes.

42. A communication network according to claim 4 or 5, wherein the transmission sources include transmitters within the fixed and mobile terminals operating in the communications network.

43. A communication network according to claim 4 or 5, wherein the transmission sources include satellite transmitters.

* * * * *